Feb. 5, 1946.　　　　H. W. LORD　　　　2,394,389
PULSE GENERATING CIRCUIT
Filed Feb. 12, 1943

Inventor:
Harold W. Lord,
by Harry E. Dunham
His Attorney.

Patented Feb. 5, 1946

2,394,389

UNITED STATES PATENT OFFICE 2,394,389

PULSE GENERATING CIRCUIT

Harold W. Lord, Schenectady, N. Y., assignor to General Electric Company, a corporation of New York Application February 12, 1943, Serial No. 475,597

13 Claims. (Cl. 250—27)

My invention relates to pulse generating circuits and more particularly to such circuits for use in connection with pulse transmitters and the like.

It is an object of my invention to provide new and improved circuits of this character which are efficient, simple in form, and capable of producing pulses of considerable power.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Figs. 1 and 2 are diagrammatic representations of pulse generating circuits embodying the principles of my invention.

Figure 1:
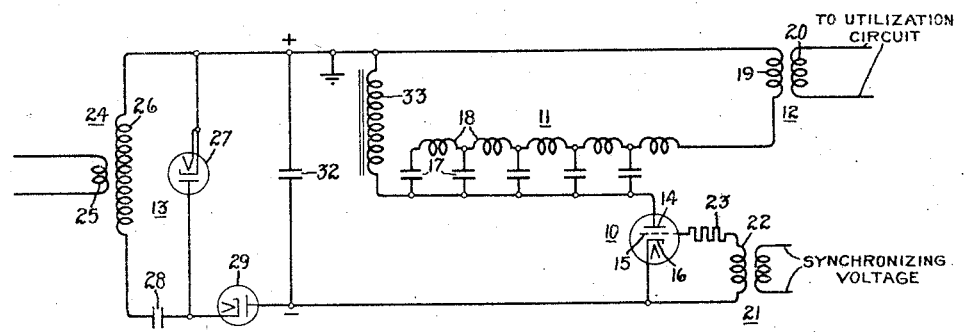
Figure 2:
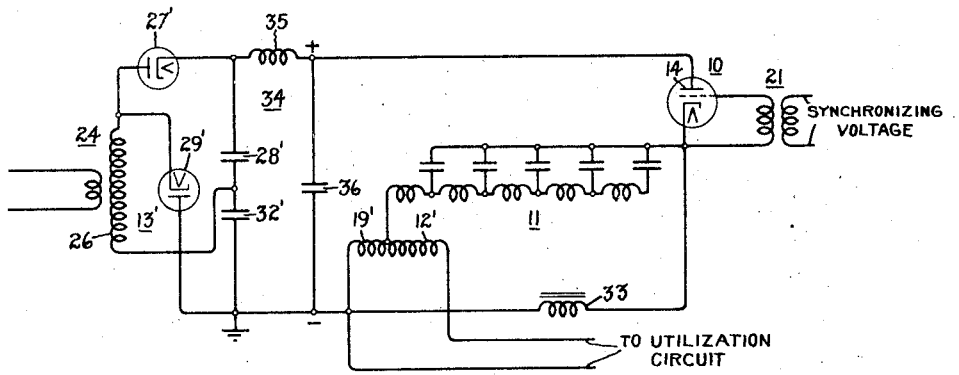

In both figures of the drawing are shown pulse generating circuits comprising an electron discharge device 10, a pulse forming element 11 in the form of an artificial transmission line section, and a load element or device 12, connected in series across a suitable source of direct current which in Fig. 1 is indicated at 13 and in Fig. 2 at 13′. In order to form pulses in the load device 12, means is provided for rendering conductive the discharge device 10 throughout the pulse period in order that the element 11 may be charged up from the source 13 through the load device. The pulse is initiated when conduction through the discharge device 10 begins and is terminated when the wave induced in the element 11 is reflected back to the starting end from the open end of the line. The circuit arrangement of Fig. 1 produces pulses of negative polarity with respect to ground in the primary winding 19 of the load device, whereas the circuit illustrated in Fig. 2 causes pulses of positive polarity with respect to ground to be developed in the load device.

Referring particularly to Fig. 1, the discharge device 10 is of the gas-filled type, as a thyratron, for example, having an anode 14, a control electrode 15, and a cathode 16, the cathode being connected to the negative terminal of the source 13.

The pulse forming and determining element 11 is preferably constituted by a suitable artificial transmission line or line section comprising a plurality of condensers 17 and reactors 18. One side of each of the condensers is connected together and to the anode 14, and the other sides of the condensers are connected together through the reactors.

The load device illustrated in Fig. 1 comprises a transformer having a primary 19, one side of which is connected to the positive terminal of the source 13 and to ground, the other side of the winding 19 being connected through a reactor section to the line 11. The secondary 20 of the load device is connected to a suitable utilization circuit or load as a transmitter oscillator.

In order to synchronize the pulses, or to initiate a pulse whenever desired, a source of synchronizing voltage is connected between the cathode 16 and the control electrode 15 of the device 10. In the illustrative form of my invention, there is provided a transformer 21, the secondary 22 of which is connected between the cathode and the control electrode through a resistor 23. The primary winding of the transformer is connected to any suitable trigger circuit or device for supplying the necessary potential to cause the discharge device 10 to become conductive.

The illustrative direct current source 13 is of the doubler type and comprises a transformer 24, the primary 25 being connected to a suitable source of alternating current and the secondary 26 being connected in series with a diode rectifier 27 and a capacitor 28. If the alternating current peak voltage across the secondary is considered to be $$\frac{V}{2}$$

the condenser 28 will be charged to $$\frac{V}{2}$$

on those half cycles when the lower end of the secondary winding 26 is positive. The capacity of the condenser 28 is sufficiently great to maintain substantially the entire charge on the alternate half cycles so that during the alternate half cycles when the upper end of the transformer winding 26 is positive there is applied across a second diode rectifier 29 and a second condenser 32 a potential equal to V. The condenser 32 is of such capacity as to maintain substantially constant the voltage thereacross. With the arrangement shown in Fig. 1 the upper side of the condenser 32 is positive and the lower side is negative as shown by the plus and minus signs. The filaments of the rectifiers 27 and 29 are preferably energized from suitable filament transformers, not shown. One side of the filament of device 27 may be grounded, as shown.

Let it be assumed that the discharge device 10 is nonconducting and that there is no charge present on the line 11, but that the pulse generating circuit is connected to the source of potential. At any time thereafter, if a synchronizing voltage of sufficient potential is applied to the control electrode 15, the discharge device 10 becomes conductive and, neglecting the voltage drop in the device 10, the entire potential V appears across the element 11 and the winding 19. If the resistance of the load device in the discharge circuit is equal to the surge impedance of the line 11, a voltage $$\frac{V}{2}$$

appears across the line and an equal voltage appears across the winding device 19. The potential impressed on the line 11 causes a wave to travel down the line which is reflected at the open end and travels back to the starting end in proper phase so that as the wave finishes its travel, all of the voltage applied across the line and the load device (equal to V) appears across the line in the form of a charge on each of the capacitors 17. Since the total voltage supplied from the source 13 is V, there is no voltage across the winding 19 and no voltage across the discharge device 10 so that the pulse is terminated and the discharge device becomes nonconductive.

Just before the device 10 becomes conductive there is of course no current flowing through the winding 19 of the load device and the potential of the lower end of the winding 19 is substantially the same as the upper end, i. e. $+V$. As soon as the device 10 becomes conductive, a voltage suddenly appears across the winding 19 and the lower end of the winding is then less positive, i. e., $$+\frac{V}{2}$$

and when the device 10 stops conducting, the potential suddenly becomes $+V$ again. Hence there results a pulse of amplitude $$\frac{V}{2}$$

and negative with respect to ground across the winding 19. The duration of the pulse depends upon the time constants of the pulse forming element 11, that is, the length of time required for a wave to travel to the open end of the line and the reflection thereof to travel back to the starting end of the line.

At the end of the pulse, the charge on the capacitors 17 leaks off through a reactor 33 connected between the common side of the condensers and ground. The reactor 33 has a relatively high inductance compared to that of the line 11 and the load device 12 so that during the short time required for charging the line 11 no appreciable energy is stored.

If the reactor 33 has such an inductance as to cause it to resonate with the total capacity of the line at a frequency corresponding to one-half of the repetition rate of the pulse generating circuit, the capacitors 17 will discharge to zero and then be recharged to the reverse or opposite polarity and to a potential only slightly less than the potential to which they were charged by the discharge device 10 during the period or interval between the termination of one pulse and the appearance of the next pulse. Firing of the discharge device will again reverse the polarity of the charge on the capacitors 17 and produce a negative pulse voltage across the load which approximately equals the direct current supply voltage (V) so long as the resistance of the load device 19 substantially matches the surge impedance of the line.

It has been found that improved operation is had by maintaining the anode 14 slightly negative with respect to the cathode for a period of time immediately following the conduction period. This may be accomplished by mismatching the surge impedance of the line 11 and the resistance of the load device so that more than half of the impressed voltage appears across the line when the discharge device 10 is conducting. It has been found that an inverse voltage of about 10% with respect to the peak forward voltage is satisfactory. Under these conditions the maximum peak voltage to ground will be approximately 120% of the direct current supply voltage. The same result may also be obtained by inserting an additional reactance of suitable value between the line 11 and the load device 12.

The circuit of Fig. 1 has one side of the high voltage rectifier transformer winding 26, one side of the discharge reactor 33, and one winding of the filament transformer for rectifier 27 at ground potential. With this arrangement the maximum peak voltage to ground at any point in the pulse generating circuit will not exceed approximately 120% of the direct current supply source voltage and similarly the maximum peak voltage across the pulse determining line 11 will not exceed approximately 120% of the direct current supply voltage. Thus while there is a total swing of 2V across the line 11, the potential does not materially exceed the voltage V to ground so that there is less breakdown voltage across the condensers 17 whereby less insulation is required on all the parts in the pulse determining circuit and accordingly a less expensive, less bulky, and lighter weight pulse generating device is provided.

In Fig. 2 there is shown a pulse generating circuit which is generally similar to the circuit of Fig. 1 but the disposition of the discharge and load devices is reversed in order to provide positive pulses with respect to ground in the load device. With this arrangement the anode 14 is connected to the source of positive potential and the load device 12' is connected between the negative terminal of the voltage source 13' and the line 11. The negative side of the power source is grounded. In this form of my invention the load device 12' may be an autotransformer having a portion 19' thereof in the pulse generating circuit.

A different form of voltage doubling circuit is provided according to which the condensers 28' and 32' are connected in series across the series connected diode rectifiers 27' and 29'. One end of the secondary winding 26 of the transformer 24 is connected between the anode of the rectifier 27' and the cathode of the rectifier 29' and the other end of the winding 26 is connected between the condensers 28' and 32'. With this arrangement, during those half cycles of the alternating current supply when the upper end of the winding is positive, the capacitor 28' is charged and during the alternate half cycles the condenser 32' becomes charged. The connections are such that the potentials across the condensers add. The rectified output is applied across a suitable filter circuit 34 comprising an inductance 35 and a condenser 36.

While I have shown and described a particular embodiment of my invention, it will be obvious to those skilled in the art that changes and modifications may be made without departing from my invention in its broader aspects. For example, any desired load devices and any suitable sources of direct current voltage may be employed. I therefore aim in the appended claims to cover all such changes and modifications as fall within the true spirit and scope of my invention.

What I claim as new and desire to secure by Letters Patent of the United States, is:

1. In combination in a pulse generating circuit, a direct current source, an open-ended transmission line section for forming and determining the duration of said pulses, a load element, and means for impressing a potential on said transmission line section from said source through said load element throughout each pulse period.

2. In combination in a pulse generating circuit, a direct current source, an open-ended transmission line section for forming and determining the duration of said pulses, a load element, and means for impressing a potential on said transmission line section from said source through said load element throughout each pulse period, and means for discharging said transmission line section and recharging said line section to the opposite polarity after the termination of said pulse.

3. In combination, in a pulse generating circuit, a direct current source, an open-ended transmission line section for forming and determining the duration of said pulses, a load element, and means for impressing a potential on said transmission line section from said source through said load element throughout each pulse period, and oscillatory means for discharging said transmission line section, and recharging said line section to the opposite polarity after the termination of said pulse.

4. In combination in a pulse generating circuit, a direct current source, an open-ended transmission line section for forming and determining the duration of said pulses, a load element, and means for impressing a potential on said transmission line section from said source through said load element throughout each pulse period, and oscillatory means including an inductive element and said line for discharging said line, and recharging said line to the opposite polarity during the interval between the termination of one pulse and the appearance of the next pulse.

5. In a pulse generating circuit, an open-ended transmission line section for forming and determining the duration of said pulses, a load element in series with said line section, a direct current source adapted to be connected across said element and said line section, an inductive element connected across said element and said line section, the inductance of said inductive element being relatively high compared to that of said line section, means for impressing a potential on said line section from said source through said load element during each pulse period, said inductive element causing said line section to be discharged and recharged to the opposite polarity during the periods between said pulses.

6. In combination, a direct current source, the positive terminal of which is grounded, a pulse generating circuit energized therefrom and comprising an electron discharge device having an anode, a control electrode, and a cathode connected to the negative terminal of said source, a pulse forming element connected to said anode, a load device one terminal of which is connected to the positive terminal of said source and the other terminal of which is connected to said element, means for causing negative pulses to appear in said load device comprising means for rendering conductive said discharge device in order to initiate said pulses, and means for rendering nonconductive said device for terminating said pulse.

7. In combination, a direct current source, a pulse generating circuit energized therefrom and comprising an electron discharge device having an anode, a control electrode, and a cathode connected to the negative terminal of said source, a pulse forming element connected to said anode, a load device, one terminal of which is connected to the other terminal of said source and the other terminal of which is connected to said element, means for causing pulses to appear in said load device and comprising means for rendering conductive said discharge device in order to initiate said pulses, and means for rendering nonconductive said device for terminating said pulses, the surge impedance of said transmission line and the resistance of said load device being substantially the same whereby the voltages impressed thereacross are substantially equal.

8. In combination, a direct current source, a pulse generating circuit energized therefrom and comprising an electron discharge device having an anode, a control electrode, and a cathode connected to the negative terminal of said source, a pulse forming element connected to said anode, a load device, one terminal of which is connected to the other terminal of said source and the other terminal of which is connected to said element, means for causing pulses to appear in said load device and comprising means for rendering conductive said discharge device in order to initiate said pulses, means for rendering nonconductive said device for terminating said pulses, the surge impedance of said line being slightly greater than the resistance of said load device so that the voltage impressed across said line during the formation of said pulses is slightly greater than that impressed across said load device whereby said anode acquires a negative potential upon the termination of each of said pulses.

9. In combination, a direct current source the positive terminal of which is grounded, an electron discharge device comprising an anode, a control electrode, a cathode connected to the negative terminal of said source, an open-ended transmission line section for determining the duration of said pulses, one side being connected to the anode, a load element connection between the other side of said line and said positive terminal of said source, means for rendering conductive said device for impressing a potential on said transmission line section from said source through said element for causing a wave to travel to the open end of said line and to be reflected back to the starting end of said line, said line being constructed and arranged such that the pulses are terminated at the arrival of the reflected wave at the starting end, and means for discharging said transmission line and recharging said line to the opposite polarity after the termination of each of said pulses.

10. In combination, a direct current source the positive terminal of which is grounded, an electron discharge device comprising an anode, a control electrode, a cathode connected to the negative terminal of said source, an open-ended transmission line section for determining the duration of said pulses, one side being connected to the anode, a load element connection between the other side of said line and said positive terminal of said source, means for rendering conductive said device for impressing a potential on said transmission line section from said source through said element for causing a wave to travel to the open end of said line and to be reflected back to the starting end of said line, said line being constructed and arranged such that the pulses are terminated at the arrival of the reflected wave at the starting end, oscillatory means including an inductive element and said line for discharging and recharging said line to the opposite polarity during the period between the termination of one pulse and the appearance of the next pulse.

11. In combination, a direct current source, an open-ended transmission line section having input terminals, a load circuit having an impedance substantially equal to the impedance of said line, and electron discharge means arranged recurrently to connect said load circuit in series circuit relation with said input terminals across said source at intervals no less than the reflection period of said line, whereby pulses applied to said input terminals upon initiation of discharge in said discharge means are reflected by said line in such phase that voltage is removed from said load circuit and said discharge means rendered non-conductive by the reflected pulse.

12. In combination, a source of direct current having its negative terminal grounded, an electron discharge device having an anode connected to the positive terminal of said source, a cathode and a control electrode, an open-ended transmission line section having a pair of input terminals, a load impedance connected in series circuit relation with said input terminals between said cathode and said negative terminal of said source, and means for periodically rendering said discharge device conductive thereby to impress a pulse voltage upon said input terminals, and a positive pulse across said load impedance, said transmission line section reflecting said pulse voltage thereby to terminate said positive pulse and to render said discharge device non-conductive.

13. In a pulse generating circuit, a non-oscillatory capacitive pulse forming and determining circuit having input terminals, a load element, an electron discharge device having an anode and a cathode, a source of direct current supply connected to said anode and said cathode in series circuit relation with said load element and said input terminals, and means for recurrently rendering said electron discharge device conductive thereby recurrently to impress a potential from said source upon said input terminals throughout each pulse period, said pulse forming element determining said pulses by delayed removal of anode potential from said discharge device thereby to render said discharge device non-conductive.

HAROLD W. LORD.